(12) United States Patent
Chiang et al.

(10) Patent No.: US 7,310,539 B2
(45) Date of Patent: Dec. 18, 2007

(54) PORTABLE COMMUNICATION DEVICE WITH PLURAL OLFACTORY CUING

(75) Inventors: Tsung-Wei Chiang, Tu-Cheng (TW); Ming-Chiang Tsai, Tu-Cheng (TW); Chun-Yu Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 130 days.

(21) Appl. No.: 11/093,809

(22) Filed: Mar. 30, 2005

(65) Prior Publication Data

US 2005/0227745 A1    Oct. 13, 2005

Related U.S. Application Data

(63) Continuation-in-part of application No. 10/953,596, filed on Sep. 29, 2004.

(30) Foreign Application Priority Data

Apr. 2, 2004    (TW) .............................. 93205030 U

(51) Int. Cl.
    *H04B 1/38*    (2006.01)
    *H04M 1/00*    (2006.01)
(52) U.S. Cl. ...................... 455/567; 455/66.1
(58) Field of Classification Search ............ 455/550.1, 455/567, 575.1, 66.1; 392/390; 422/4; 428/905
    See application file for complete search history.

(56) References Cited

U.S. PATENT DOCUMENTS

| | | | |
|---|---|---|---|
| 4,837,421 A | 6/1989 | Luthy | 219/272 |
| 5,111,477 A | 5/1992 | Muderlak | 392/390 |
| 5,887,118 A * | 3/1999 | Huffman et al. | 392/390 |
| 6,085,026 A | 7/2000 | Hammons et al. | 392/390 |
| 6,371,451 B1 * | 4/2002 | Choi | 261/26 |
| 2003/0206834 A1 * | 11/2003 | Chiao et al. | 422/124 |
| 2004/0203412 A1 * | 10/2004 | Greco et al. | 455/66.1 |
| 2004/0204043 A1 * | 10/2004 | Wang et al. | 455/556.1 |
| 2004/0235430 A1 * | 11/2004 | Ma et al. | 455/90.1 |
| 2005/0192065 A1 * | 9/2005 | Chiang et al. | 455/575.1 |
| 2006/0037970 A1 * | 2/2006 | Fazzio et al. | 222/145.1 |
| 2006/0062408 A1 * | 3/2006 | Cho et al. | 381/177 |

FOREIGN PATENT DOCUMENTS

| | | | |
|---|---|---|---|
| DE | 10065545 A1 * | 7/2002 | |
| JP | 03211330 A * | 9/1991 | |
| WO | WO 02/15541 A1 | 2/2002 | |

* cited by examiner

*Primary Examiner*—Nguyen T. Vo
(74) *Attorney, Agent, or Firm*—Morris Manning Martin LLP; Tim Tingkang Xia, Esq.

(57) ABSTRACT

A portable communication device includes a body (11) having a container (111) and a buffer room (115), and a plurality of fragrance releasing apparatuses (12) housed in the container. The body houses main circuitry therein. The buffer room communicates with the container and outside environment. The container also houses a plurality of electrical connectors therein. The electrical connectors are electrically connected with the main circuitry. Each fragrance releasing apparatus includes a vessel (121) with a nozzle (127). Each nozzle includes a heater (128) connecting with and being enabled by the main circuitry via the corresponding electrical connector. When the portable communication device receives an incoming call (or message), predetermined heaters are enabled by the main circuitry to release a fragrance corresponding to the caller (or sender).

4 Claims, 6 Drawing Sheets

PORTABLE COMMUNICATION DEVICE WITH PLURAL OLFACTORY CUING

CROSS-REFERENCE TO RELATED APPLICATION

The present application is a continuation-in-part of another patent application entitled "Portable Communication Device With Plural Olfactory Cuing," filed on Sep. 29, 2004 with the application Ser. No. 10/953,596 and assigned to the same assignee as the present application.

BACKGROUND

1. Field of the Invention

The present invention generally relates to portable communication devices such as mobile phones, and more particularly to a portable communication device which has a plurality of fragrance releasing apparatuses therein for the purposes of cuing a user.

2. Related Art

Currently, portable electronic communication devices provide a variety of means for notifying (cuing) the user of a new incoming call or message. For example, the portable communication device may sound a ring tone, play music, or vibrate. However, if the user is in a meeting or on a noisy street, he/she may not hear the ring tone or music. In addition, if the portable communication device is not beside the user's body, he/she may not feel the vibration.

A mobile phone employing a unit storing fragrance therein can be found in International Patent No. WO/0215541 issued to Andreas Wuellner and published on Feb. 21, 2002. Using fragrance is an alternative way to cue the user to an incoming call. This kind of mobile phone typically comprises an interchangeable unit provided to couple with mobile support elements. The interchangeable unit is able to store fragrant liquid, and release the corresponding fragrance into the environment. Thus when an incoming call is received by the mobile phone, the fragrance can be released into the environment to cue the user. However, the fragrance cuing function does not enable the user to ascertain who the caller is.

Therefore, a portable communication device with fragrance cuing which can differentiate among incoming callers is desired.

SUMMARY

Accordingly, an object of the present invention is to provide a portable communication device having a plurality of fragrance releasing apparatuses therein, which can cue a user regarding different incoming callers using different fragrances.

To achieve the above object, an exemplary embodiment of the inventive portable communication device comprises a body including a container and a buffer room. The body houses main circuitry therein. The buffer room communicates with the container and outside environment. A plurality of fragrance releasing apparatuses are housed in the container. The container also houses a plurality of electrical connectors therein. The electrical connectors are electrically connected with the main circuitry. Each fragrance releasing apparatus includes a vessel, and each vessel has a nozzle. Each nozzle includes a heater connecting with and being enabled by the main circuitry via the corresponding electrical connector. When the portable communication device receives an incoming call (or message), predetermined heaters are enabled by the main circuitry to release fragrance corresponding to the caller (or sender).

Other objects, advantages and novel features of the invention will become more apparent from the following detailed description when taken in conjunction with the accompanying drawings, in which:

DETAILED DESCRIPTION OF THE EMBODIMENTS

Figure 1:
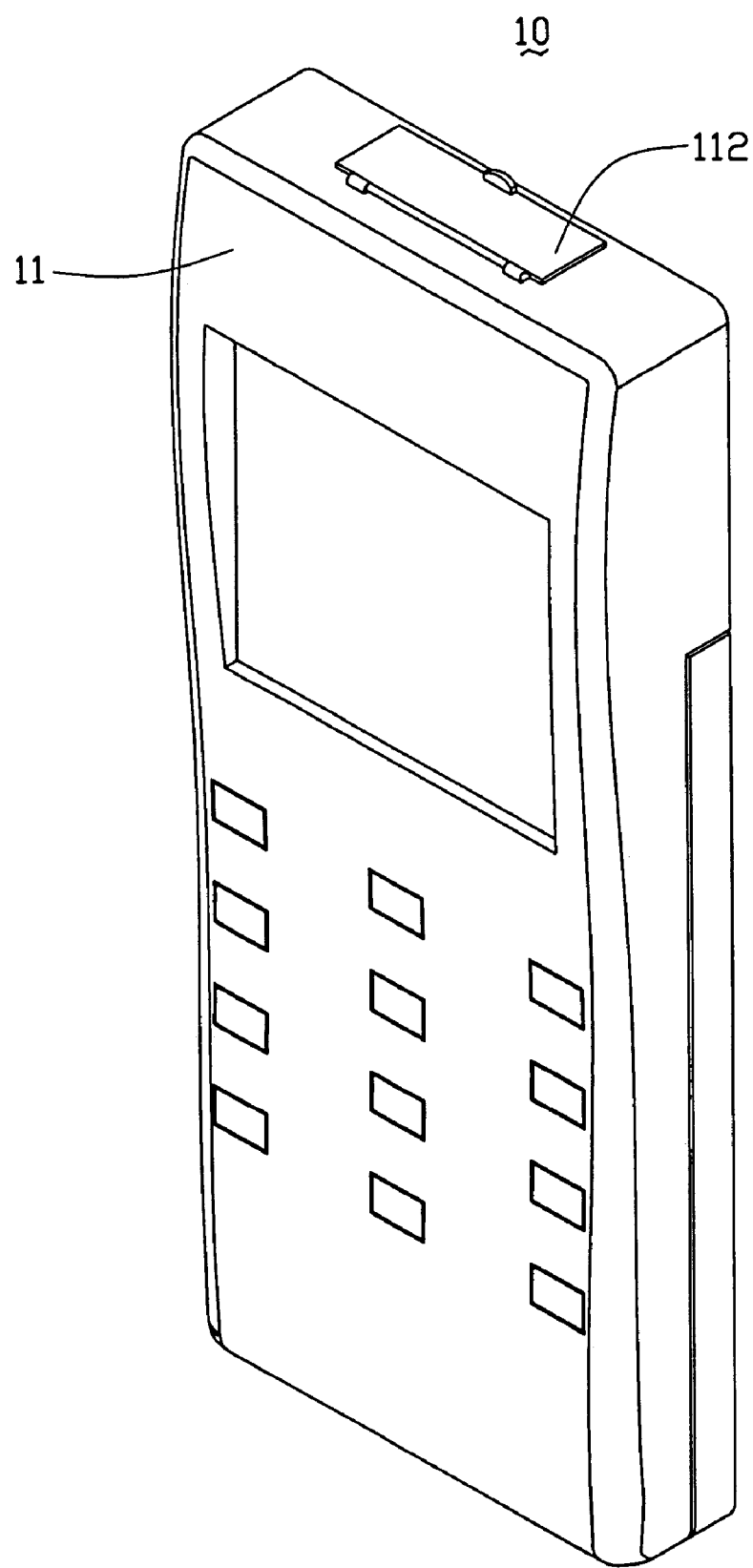
FIG. 1 is an isometric view of a mobile phone in accordance with a preferred embodiment of the present invention, the mobile phone including a container cover.
Figure 2:
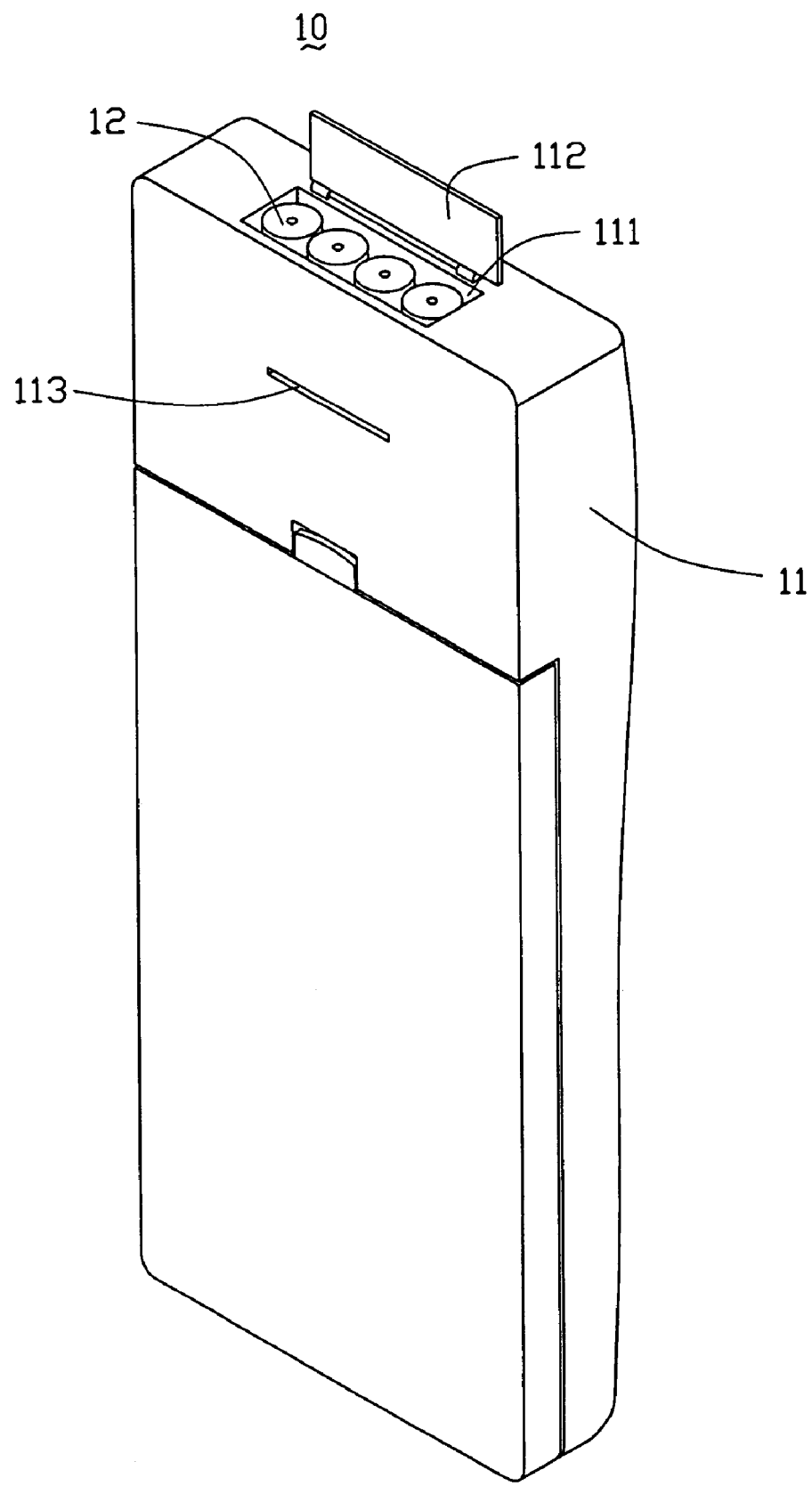
FIG. 2 is similar to FIG. 1, but showing the mobile phone viewed from another aspect with the cover open, and showing four fragrance releasing apparatuses housed in the mobile phone below the cover.
Figure 3:
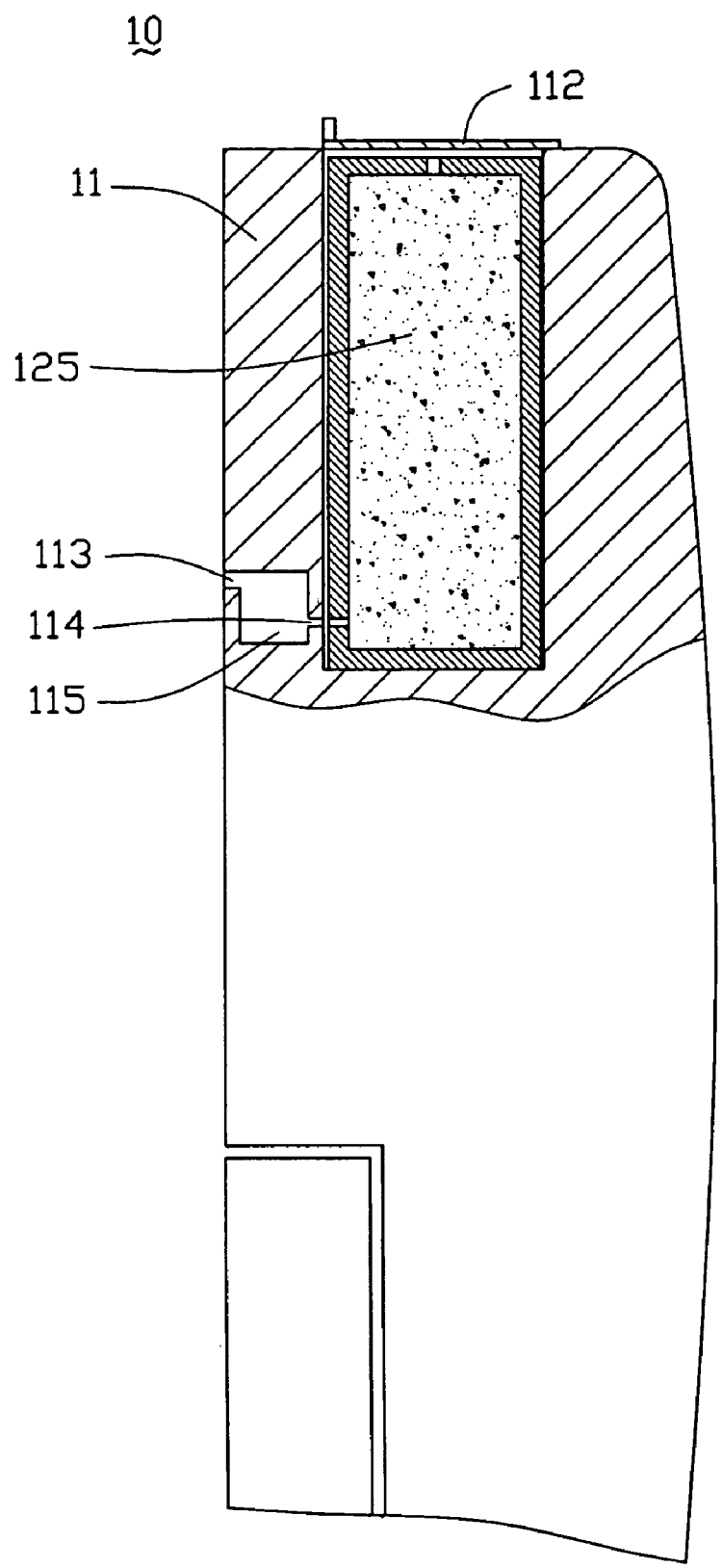
FIG. 3 is a partly cutaway, side elevation view of the mobile phone shown in FIG. 1.

A portable communication device in accordance with the preferred embodiment of the present invention is a mobile phone 10. Referring to FIGS. 1, 2 and 3, the mobile phone 10 includes a body 11 and four fragrance releasing apparatuses 12.

The body 11 includes a container 111 in one end thereof, a container cover 112 rotatably mounted on said end by a hinge (not labeled), a buffer room 115 communicating with the container 111 via four channels 114, and a hole 113 defined in a main wall of the body 11 at the buffer room 115. The channels 114 are lower than the hole 113. The container 111 defines an opening (not labeled) in said end of the body 11 at the hinge. The container 111 includes a plurality of pedestals (not shown) in a bottom thereof, and a plurality of electrical connectors (not shown) provided on the pedestals. The electrical connectors are electrically coupled with main circuitry (not shown) of the mobile phone 10 in the body 11. The cover 112 is hinged near the opening of the container 111, and can cover the opening. The fragrance releasing apparatuses 12 are received in the container 111, fixed on the pedestals, and covered by the cover 112. Each fragrance releasing apparatus 12 engages with a corresponding electrical connector, so that it is electrically connected with the main circuitry of the mobile phone 10.

Figure 4:
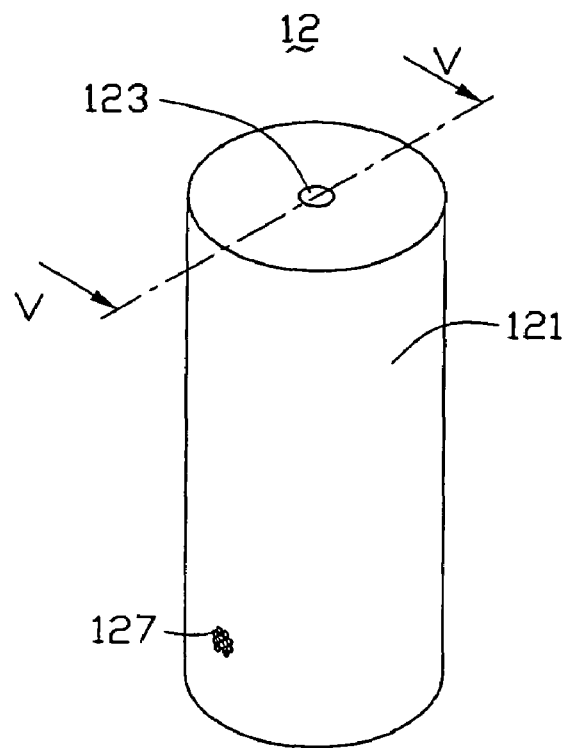
FIG. 4 is an enlarged, isometric view of one of the fragrance releasing apparatuses of FIG. 2, the fragrance releasing apparatus including a vessel, the vessel having a nozzle.
Figure 5:
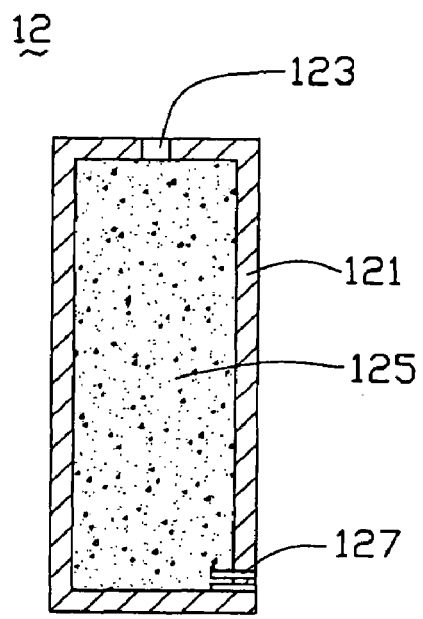
FIG. 5 is a schematic, cross-sectional view taken along line V-V of FIG. 4.

Referring to FIGS. 4 and 5, each fragrance releasing apparatus 12 includes a vessel 121 containing a core 125 therein. The vessel 121 also includes an entrance 123 in a top thereof, and a nozzle 127 at a bottom thereof. The core 125 is made of a material which has good liquid absorbing capability, such as sponge. An inner end of the nozzle 127 is embedded in the core 125, and an outer end of the nozzle 127 typically has a plurality of openings in a sidewall of the vessel 121. Fragrant liquid is stored in the core 125. When the fragrant liquid is completely used up, a user can insert new fragrant liquid into the core 125 with an injector.

Figure 6:
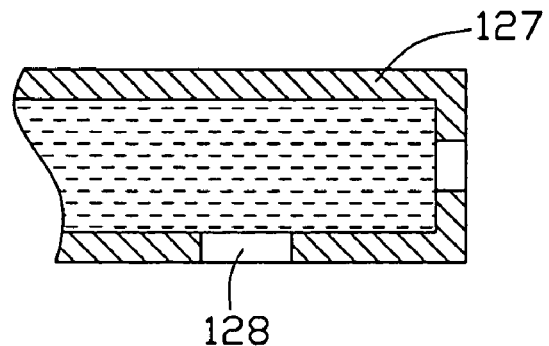
FIG. 6 is an enlarged, schematic, cross-sectional view of an end portion of the nozzle shown in FIG. 5, the nozzle including a heater and an opening and containing fragrant liquid.

Referring to FIG. 6, each nozzle 127 comprises a heater 128 in a wall thereof. In the preferred embodiment, the heater 128 is a resistance heater. When the fragrance releasing apparatus 12 is installed in the container 111, the heater 128 is connected with one of the electrical connectors. The main circuitry of the mobile phone 10 can thus send out a pulse signal 1006 (see FIG. 11) to enable the heater 128. In general, the nozzle 127 is full of fragrant liquid. The nozzle 127 is very thin, so that the fragrant liquid is retained therein without effusing out.

Figure 7:
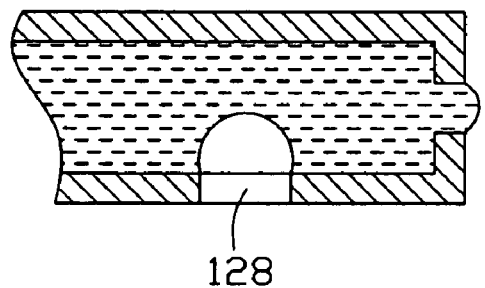
FIG. 7 is similar to FIG. 6, but showing some of the fragrant liquid changed into fragrant gas at the heater.
Figure 8:
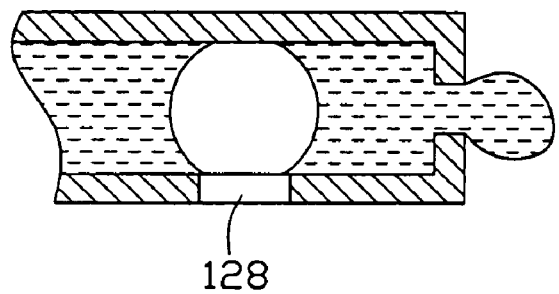
FIG. 8 is similar to FIG. 7, but showing more of the fragrant liquid changed into fragrant gas, thereby pushing some fragrant liquid out through the opening.
Figure 9:
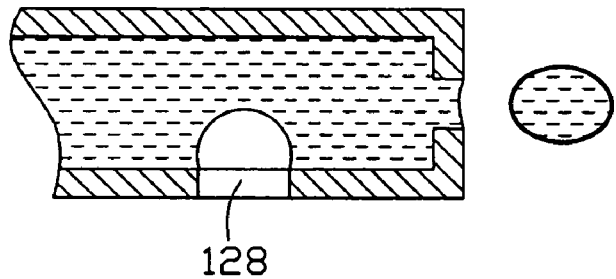
FIG. 9 is similar to FIG. 8, but showing the fragrant liquid and the fragrant gas when a complete globule of fragrant liquid has been pushed out of the opening.

Referring to FIGS. 7, 8 and 9, when the heater 128 is enabled by a pulse signal 1006, the temperature of the heater 128 rises to 300 degrees Centigrade immediately. Some of the fragrant liquid near the heater 128 changes to fragrant gas and expands. The gas pushes some of the fragrant liquid near the opening of the nozzle 127 out through the opening. This fragrant liquid then enters the buffer room 115 through the channel 114, and the fragrant liquid then exits the mobile phone 10 through the hole 113. In addition, because the pulse signal 1006 is very short and the heating temperature is high, the gas near the heater 128 rapidly expands, so that it obstructs liquid located far from the opening from reaching the opening. Thus only a predetermined amount of the fragrant liquid is released from the opening, with no wastage.

The user programs the mobile phone 10 so that each of pre-identified senders is assigned a particular fragrance according to fragrant liquid contained in a corresponding fragrance releasing apparatus 12, or according to a mixture of two or more fragrant liquids contained in the corresponding fragrance releasing apparatuses 12. Two or more fragrant liquids simultaneously released from the corresponding fragrance releasing apparatuses 12 are mixed in the buffer room 115. The user may define the relative proportions of fragrant liquids simultaneously released by the fragrance releasing apparatuses 12, the different fragrances mixing and making a particular unified fragrance in the buffer room 115. The function of cuing the user regarding incoming calls according to fragrance is thus enabled.

Figure 10:
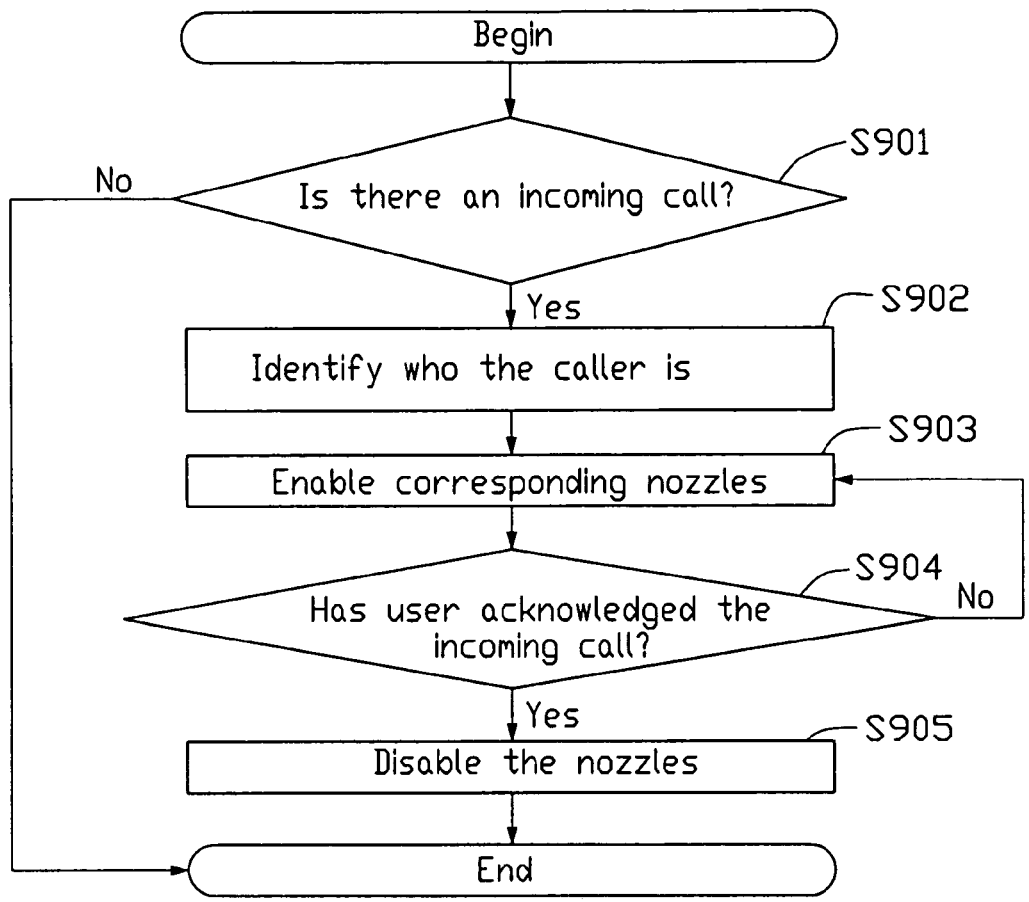
FIG. 10 is a flow chart of preferred operation of the mobile phone of FIG. 1.

In the following description, it will be assumed that any incoming call (or message) is from a pre-identified caller (or sender), and not from a previously unknown caller (or sender). Referring to FIG. 10, when an incoming call arrives at the mobile phone 10, the main circuitry controls the fragrance releasing apparatuses 12 as follows. First, in step S901, the main circuitry determines whether there is an incoming call. If there is no incoming call, the procedure is ended. If there is an incoming call, in step S902, the main circuitry identifies who the caller is. Then in step S903, the main circuitry sends a pulse signal 1006 to the nozzle 127 of a corresponding fragrance releasing apparatus 12, or to the nozzles 127 of at least two corresponding fragrance releasing apparatuses 12. Next, in step S904, the main circuitry determines whether there is a signal or answering message which indicates that the user has acknowledged the incoming call. If the user has not acknowledged the incoming call, the procedure returns to step S903. If and when the user has acknowledged the incoming call, in step S905, the main circuitry disables the nozzle(s) 127 of the corresponding fragrance releasing apparatus(es) 12, whereupon the procedure is ended. In other words, until the user acknowledges the incoming call, the nozzle(s) of the corresponding fragrance releasing apparatus(es) 12 is/are continually enabled by the pulse signal 1006, so that the nozzle(s) 127 emits/emit enough fragrance for the user to be successfully cued regarding the incoming call.

Figure 11:
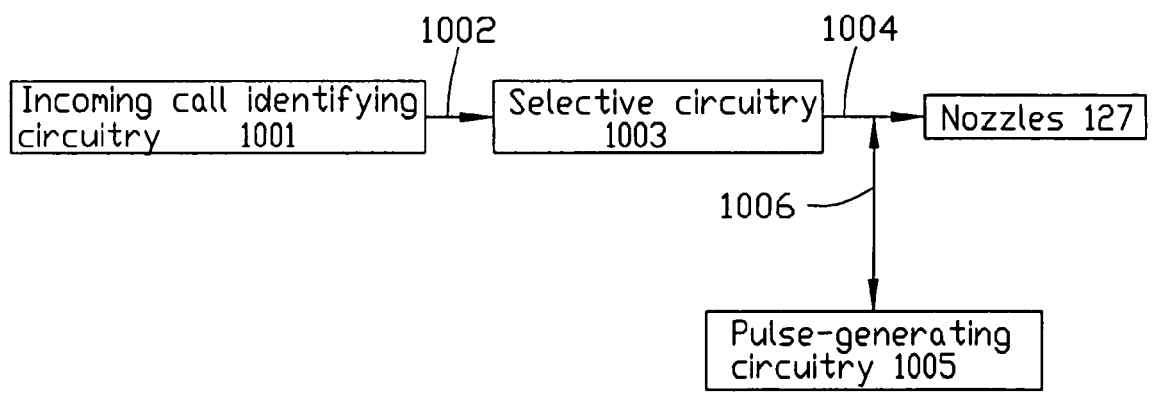
FIG. 11 is a schematic diagram of electrical and physical relationships between certain components of the mobile phone of FIG. 1.

Referring to FIG. 11, the main circuitry includes incoming call identifying circuitry 1001, selective circuitry 1003, and pulse-generating circuitry 1005. In step S902 described above in relation to FIG. 10, the incoming call identifying circuitry 1001 sends out a control signal 1002 to the selective circuitry 1003. Then in step S903, the selective circuitry 1003 sends out a selective signal 1004 to a corresponding fragrance releasing apparatus 12 or to at least two corresponding fragrance releasing apparatuses 12, and to the pulse-generating circuitry 1005. Then the pulse-generating circuitry 1005 sends out a pulse signal 1006 to enable the heater(s) of the corresponding nozzle(s) 127.

It is to be understood that in various alternative embodiments of the present invention, the container 111 may be provided in the body 11 in any suitable position. Further, two, three, or more than four fragrance releasing apparatuses 12 may be employed. When two or more fragrance releasing apparatuses 12 are employed, they may be separately distributed in the body 11, or they may be integrated together. Further, the described electrical connectors may be integrated into a single electrical connector.

It is believed that the embodiments and their advantages will be understood from the foregoing description, and it will be apparent that various changes may be made thereto without departing from the spirit and scope of the invention or sacrificing all of the material advantages of the invention. The examples hereinbefore described are merely preferred or exemplary embodiments of the invention.

We claim:

1. A portable communication device, comprising:
a body enclosing said portable communication device, said body comprising a container with at least two fragrance releasing apparatuses therein, and a buffer room disposed next to said container and in communication with said at least two fragrance releasing apparatuses for fragrance transmission between said at least two fragrance releasing apparatuses and said buffer room so that fragrance from said at least two fragrance releasing apparatuses is movable into said buffer room, each fragrance releasing apparatus having a nozzle, said buffer room defining a hole therein, said nozzle communicating with said buffer room and releasing said fragrance into said buffer room and being offset from said hole of said buffer room for releasing said fragrance out of said body, and said nozzles of said at least two fragrance releasing apparatuses and said hole of said buffer room being respectively formed at two opposite sides of said buffer room; wherein
said fragrance from one of said at least two fragrance releasing apparatuses is capable of being mixed with fragrance from another of said at least two fragrance releasing apparatuses within said buffer room before said fragrance is released out of said body.

2. The portable communication device as claimed in claim 1, wherein each of said at least two fragrance releasing apparatuses includes a vessel, and each vessel includes a core for storing fragrant liquid therein.

3. The portable communication device as claimed in claim 2, wherein one end of a corresponding one of said nozzles is embedded in said core, and an outer end of said corresponding one of said nozzles defines a plurality of openings in a sidewall of said vessel.

4. The portable communication device as claimed in claim 2, wherein each vessel further includes a top end, a bottom end, and an entrance defined in said top end, and a corresponding one of said nozzles is formed at said bottom end.

* * * * *